United States Patent
Hara et al.

(10) Patent No.: US 7,860,389 B2
(45) Date of Patent: Dec. 28, 2010

(54) PHOTOGRAPHIC DEVICE, METHOD OF PROCESSING INFORMATION, AND PROGRAM

(75) Inventors: Nozomi Hara, Kanagawa (JP); Noriaki Nakagawa, Tokyo (JP); Tamaki Kojima, Kanagawa (JP); Kenichi Agata, Tokyo (JP)

(73) Assignee: Sony Corporation (JP)

( * ) Notice: Subject to any disclaimer, the term of this patent is extended or adjusted under 35 U.S.C. 154(b) by 254 days.

(21) Appl. No.: 11/522,772

(22) Filed: Sep. 18, 2006

(65) Prior Publication Data

US 2007/0065137 A1   Mar. 22, 2007

(30) Foreign Application Priority Data

Sep. 21, 2005   (JP)   ............................ P2005-273086

(51) Int. Cl.
   *G03B 17/18*   (2006.01)
(52) U.S. Cl. .................................. 396/291; 348/333.01
(58) Field of Classification Search ................. 396/291; 384/333.01
   See application file for complete search history.

(56) References Cited

U.S. PATENT DOCUMENTS

| | | | | |
|---|---|---|---|---|
| 5,198,855 A | * | 3/1993 | Iwai | ............................ 396/106 |
| 5,659,817 A | * | 8/1997 | Fujino et al. ................. 396/137 |
| 5,748,927 A | * | 5/1998 | Stein et al. ................... 715/711 |
| 6,614,996 B2 | * | 9/2003 | Okisu et al. ..................... 396/63 |
| 6,829,009 B2 | | 12/2004 | Sugimoto et al. | |
| 2001/0048815 A1 | * | 12/2001 | Nakajima et al. ........... 396/310 |
| 2005/0237411 A1 | * | 10/2005 | Watanabe .............. 348/333.02 |
| 2006/0182433 A1 | * | 8/2006 | Kawahara et al. ........... 396/123 |
| 2006/0192879 A1 | * | 8/2006 | Hisamatsu ............. 348/333.01 |

FOREIGN PATENT DOCUMENTS

| | | | |
|---|---|---|---|
| JP | 2003-189211 A | | 7/2003 |
| JP | 2003-244522 A | | 8/2003 |
| JP | 2003-274268 | * | 9/2003 |
| JP | 2003-274268 A | | 9/2003 |
| JP | 2004-254256 A | | 9/2004 |
| JP | 2005-229326 A | | 8/2005 |

OTHER PUBLICATIONS

User Manual of Nikon Digital Camera COOLPIX S1, pp. 34-44 (Apr. 15, 2005).

* cited by examiner

*Primary Examiner*—W. B. Perkey
*Assistant Examiner*—Noam Reisner
(74) *Attorney, Agent, or Firm*—Lerner, David, Littenberg, Krumholz & Mentlik, LLP

(57) ABSTRACT

A photographic device which may include a selection portion for selecting a given number of shooting modes matched with shooting conditions from a plurality of shooting modes previously prepared, a display control portion for juxtapositionally displaying images indicating the shooting modes selected by the selection portion, and a shooting control portion for taking photos in a shooting mode indicated by an image which has been selected by a user from the images displayed by the display control portion.

12 Claims, 6 Drawing Sheets

PHOTOGRAPHIC DEVICE, METHOD OF PROCESSING INFORMATION, AND PROGRAM

CROSS REFERENCES TO RELATED APPLICATIONS

The present invention contains subject matter related to Japanese Patent Application JP 2005-273086 filed in the Japanese Patent Office on Sep. 21, 2005, the entire contents of which being incorporated herein by reference.

BACKGROUND OF THE INVENTION

1. Field of the Invention

The present invention relates to a photographic device, method of processing information, and program and, more particularly, to a photographic device, method of processing information, and program permitting one to set a shooting mode intuitively and efficiently.

2. Description of the Related Art

In recent years, digital cameras having more functions have been manufactured. Concomitantly, the number of settings that the user himself can select regarding photography has increased.

Various settings can be made, for example, by manipulating a crisscross key or decision button while watching a menu window displayed on a display portion consisting, for example, of an LCD (liquid crystal display) mounted on the rear side of a digital camera that faces away from the lens side.

One of the items that the user can set is a shooting mode. For example, where the user attempts to set a shooting mode, he selects items regarding the shooting mode from the menu window and selecting a predetermined shooting mode from a list of shooting modes previously prepared in the digital camera. The list of shooting modes is displayed when those items are selected. Thus, the shooting mode can be set.

The shooting mode is selected when shooting is done using an aperture, a shutter speed, and other items suitable for the conditions of the subject. For example, "night scene mode", "portrait mode", and other modes are previously prepared. In the night scene mode, the settings are modified to aperture, shutter speed, and other items suitable for photography of night scenes. In the portrait mode, the settings are modified to aperture, shutter speed, and other items suitable for photography of persons.

The user's interface of a digital camera which is designed such that when items for the shooting mode are selected from a menu window, a list of icons for the shooting mode is displayed and the user then can select his favorite shooting mode from the list is disclosed, for example, in non-patent reference 1.

SUMMARY OF THE INVENTION

However, there is the problem that it is cumbersome to set the shooting mode. That is, as described previously, the user may need to select items for a shooting mode from a menu window to set the shooting mode and to select a desired shooting mode from a list displayed when such a selection is made. It is cumbersome to perform such selection and manipulations when he is considering the photographic composition while watching the currently captured image displayed on the display portion or when he is looking for the best photo opportunity.

Furthermore, the user may be required to previously grasp what shooting modes are available and to previously know what shooting mode should be selected under what shooting environments. This also complicates setting of shooting modes.

In view of these circumstances, the present invention has been made. The present invention is intended to permit a user to set a shooting mode intuitively and efficiently, for example, even where there are many shooting modes available.

A photographic device according to one embodiment of the present invention has a selection section for selecting a given number of shooting modes matched with shooting conditions from a plurality of previously prepared shooting modes, a display control portion for juxtapositionally displaying images indicative of the shooting modes selected by the selection section, and a shooting control section for taking photos in the shooting mode indicated by an image selected by a user out of the images displayed by the display control portion.

The display control portion is also capable of displaying an explanation of a shooting mode represented by the image on which the cursor is put, the cursor moving in response to user's manipulation. The image is included in images which are indicative of shooting modes and shown side by side.

Furthermore, the display control portion can display the captured image together with smaller images indicative of shooting modes.

A method of processing information or program according to one embodiment of the present invention includes the steps of: selecting a given number of shooting modes matched with shooting conditions from previously prepared plural shooting modes; juxtapositionally displaying images indicating the selected shooting modes; and taking photos in a shooting mode indicated by an image selected by a user out of the displayed images.

According to one embodiment of the present invention, a given number of shooting modes matched with shooting conditions are selected out of previously selected plural shooting modes. Images indicating the selected shooting modes are displayed side by side. Photography is performed in the shooting mode indicated by the image selected out of the displayed images by the user.

According to one embodiment of the present invention, a shooting mode can be set intuitively and efficiently.

DETAILED DESCRIPTION OF THE INVENTION

Embodiments of the present invention are hereinafter described. An example of the correspondence between the constituent features of the present invention and modes of practice described in the detailed description of the invention is now described. The description is intended to confirm that modes of practice supporting the present invention are described within the detailed description of the invention.

Accordingly, even if there is any mode of practice which is described in the detailed description of the invention but is not described herein as a mode of practice corresponding to constituent features of the present invention, it is not meant that this mode of practice does not correspond to the constituent features. Conversely, even if a mode of practice is described herein as corresponding to the invention, it is not meant that the mode of practice does not correspond to those other than the constituent features.

A photographic device (e.g., digital camera 1 in FIG. 1) according to one embodiment of the present invention has a selection section (e.g., shooting mode selection portion 52 in FIG. 4) for selecting a given number of shooting modes matched with shooting conditions (e.g., the time is "night") out of previously prepared plural shooting modes, a display control portion (e.g., display control portion 53 in FIG. 4) for juxtapositionally displaying images indicating the shooting modes selected by the selection section, and a shooting control section (e.g., shooting control portion 54 in FIG. 4) for taking photos in the shooting mode indicated by the image selected by a user out of the images displayed by the display control portion.

Figure 5:
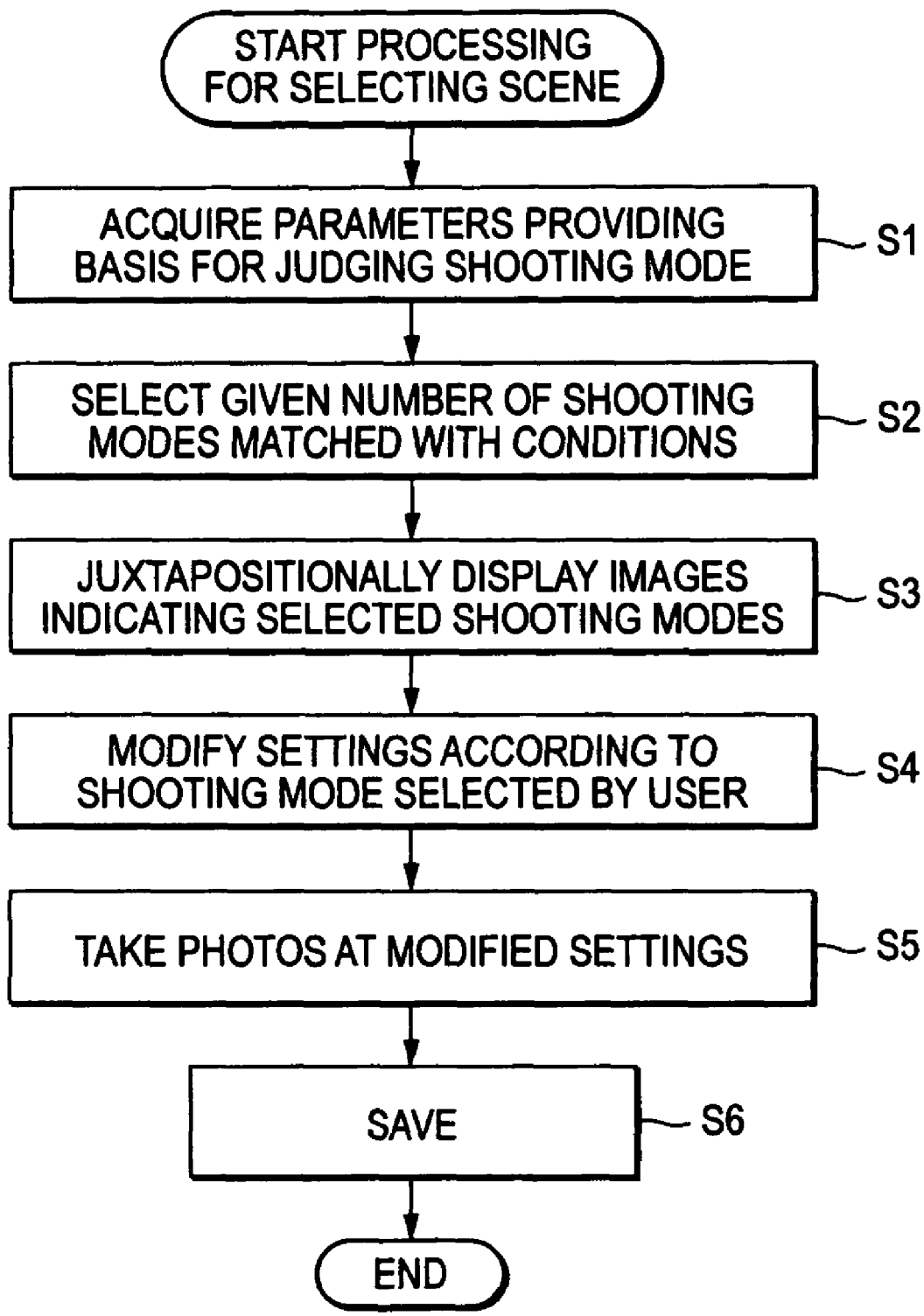
FIG. 5 is a flowchart illustrating processing performed when the scene selection function is activated.

A method of processing information or program according to one embodiment of the present invention includes the steps of: selecting a given number of shooting modes matched with shooting conditions out of previously prepared plural shooting modes (e.g., step S2 in FIG. 5); juxtapositionally displaying images indicating the selected shooting modes (e.g., step S3 in FIG. 5); and taking photos in a shooting mode indicated by an image selected out of the displayed images by a user (e.g., step S4 in FIG. 5).

Embodiments of the present invention are hereinafter described by referring to the drawings.

Figure 1:
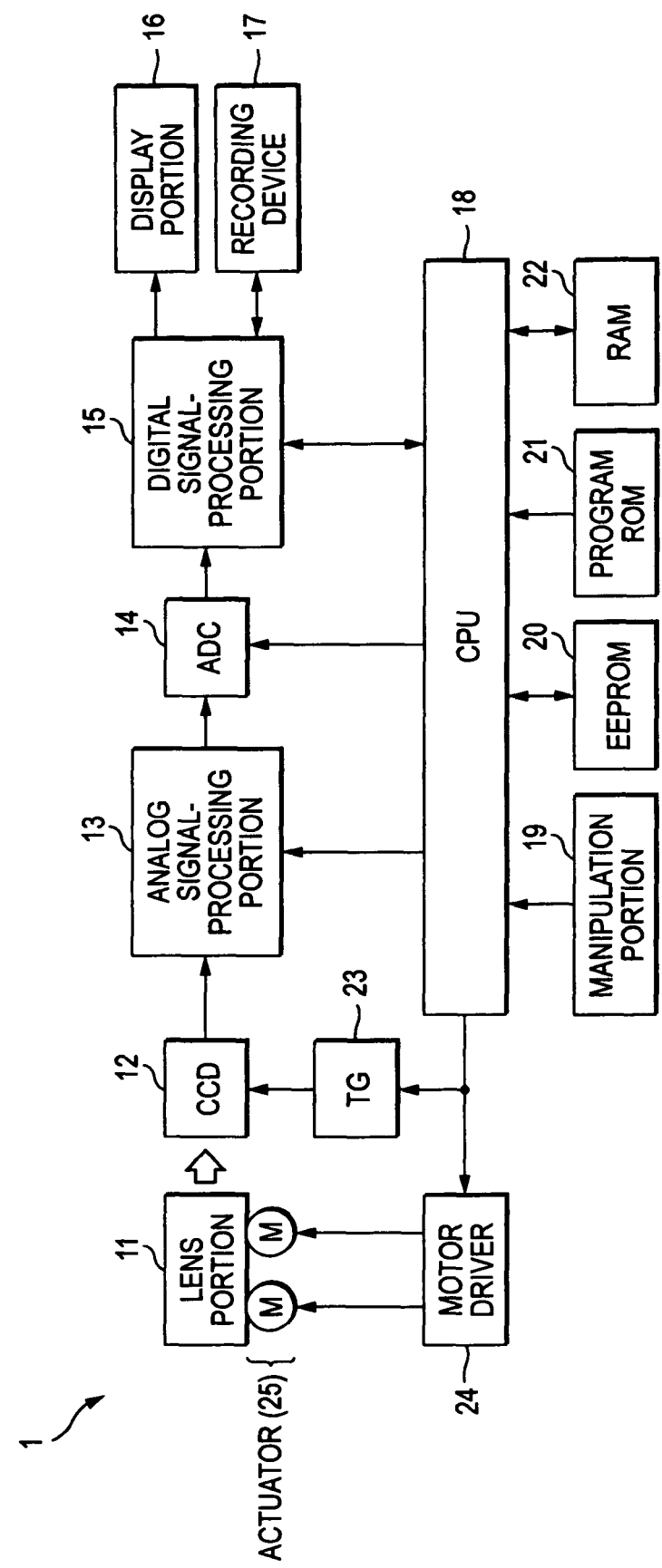
FIG. 1 is a block diagram showing an example of the hardware structure of a digital camera associated with one embodiment of the present invention.

FIG. 1 is a block diagram showing an example of the hardware structure of a digital camera 1 associated with one embodiment of the present invention.

A lens portion 11 is made of a module of optics including a lens for gathering light from a subject, a focus lens for adjusting the focus, and an aperture. Light from the subject is gathered by the lens constituting the lens portion 11 and made to enter a CCD (charge coupled device) 12.

The CCD 12 operates according to a timing signal supplied from a timing generator (TG) 23 and thus receives light from the subject, the light being entered via the lens portion 11. The received light is converted into an electrical signal by the CCD 12. This electrical signal is an analog image signal corresponding to the amount of the received light and is output to an analog signal-processing portion 13.

The analog signal-processing portion 13 processes (e.g., amplifies) the analog image signal from the CCD 12 under control of a CPU (central processing unit) 18, and outputs the resulting image signal to an A/D (analog/digital) converter portion (ADC) 14.

The A/D converter portion 14 converts the analog image signal from the analog signal-processing portion 13 into a digital signal under control of the CPU 18, and outputs image data about the resulting digital signal to a digital signal-processing portion 15.

The digital signal-processing portion 15 processes the digital signal (e.g., removes noise from image data) from the A/D converter portion 14 under control of the CPU 18, and displays on a display portion 16 an image based on data obtained by the signal processing.

The digital signal-processing portion 15 compresses the image data from the A/D converter portion 14, for example, into a JPEG (Joint Photographic Experts Group) format and supplies the resulting compressed image data to a recording device 17 such that the data is recorded there. Alternatively, the digital signal-processing portion 15 may decompress the compressed image data recorded on the recording device 17 and display the obtained image data on the display portion 16.

Furthermore, the digital signal-processing portion 15 displays a menu or other items on the display portion 16 under control of the CPU 18 to prompt the user to make settings regarding photography.

The display portion 16 is made of an LCD or the like and displays the captured image or a menu of choices used to make setting modifications by means of the CCD 12 under control of the digital signal-processing portion 15.

The recording device 17 is a removable recording medium such as a memory card consisting, for example, of a semiconductor memory. The recording device 17 can be easily attached to and detached from the digital camera 1. The recording device 17 may be made of a hard disc drive or the like.

The CPU 18 controls various portions forming the digital camera 1 and performs various kinds of processing according to a signal from the manipulation portion 19 by executing a program recorded on a program ROM (read only memory) 21.

As described later in detail, the CPU 18 selects a given number of shooting modes as recommended shooting modes matched to the present conditions from plural shooting modes previously prepared in the digital camera 1 according to conditions such as the current date and time and the brightness of the captured image, and displays a menu of choices permitting the user to select one shooting mode from the recommended modes. The user can take a photo of a desired subject at appropriate settings by selecting one shooting mode from the displayed menu.

The manipulation portion 19 is made up of a power switch, a shutter button, a zoom button, a mode dial (manipulated when the shooting mode is varied), a crisscross key, a decision button, and so on. When the manipulation portion is manipulated by the user, the manipulation portion outputs a signal corresponding to the manipulation to the CPU 18.

An EEPROM (electrically erasable programmable ROM) 20 stores data (e.g., various kinds of information set to the digital camera) that may need to be held if the power supply of the digital camera is turned off, under control of the CPU 18.

The program ROM 21 stores a program executed by the CPU 18 and data necessary for the CPU 18 to execute the program. A RAM (random access memory) 22 temporarily stores a program and data necessary for the CPU 18 to perform various kinds of processing.

The timing generator 23 outputs a timing signal to the CCD 12 under control of the CPU 18. The timing signal supplied to the CCD 12 from the timing generator 23 controls the exposure time (shutter speed) in the CCD 12.

A motor driver 24 drives an actuator (motor) 25 under control of the CPU 18. The aperture forming the lens portion 11 is adjusted and the focus lens forming the lens portion 11 is moved by the actuator 25 being driven.

The digital camera 1 is equipped with an autofocus function. The autofocus function is realized, for example, by a hill-climbing servo. When the shutter button is half depressed by the user, the focus lens is started to be moved from a given position and then moved in steps under control of the motor driver 24 until a focal point is detected. For instance, when the contrast at the center of the image captured by the CCD 12 is highest (producing the greatest RF component), the camera is judged to be in focus.

In the digital camera 1 constructed as described so far, the CCD 12 receives light from the subject, the light entering via the lens portion 11. The received light is converted into an electrical signal by the CCD 12. The resulting analog image signal is output. The analog image signal output by the CCD 12 is converted into image data about a digital signal by being passed through the analog signal-processing portion 13 and A/D converter portion 14. The image data is supplied to the digital signal-processing portion 15.

The digital signal-processing portion 15 outputs the image data from the A/D converter portion 14 to the display portion 16. Consequently, a so-called captured image is displayed on the display portion 16. It follows that the user checks whether the brightness of the subject gives an appropriate exposure or whether the camera is in focus by watching the display provided on the display portion 16.

Then, if the user manipulates the shutter button, a signal corresponding to the manipulation is supplied to the CPU 18 from the manipulation portion 19. When this signal from the manipulation portion 19 is supplied, the CPU 18 controls the digital signal-processing portion 15. At this time, image data supplied to the digital signal-processing portion 15 from the A/D converter portion 14 is compressed. The resulting compressed image data is recorded on the recording device 17. In this way, photography is performed.

The digital camera 1 constructed as described so far has a function (scene selection function) of selecting a given number of shooting modes matched to the present conditions from previously prepared plural shooting modes and presenting the selected modes to the user. The user can set a shooting mode simply by selecting a desired mode from the presented modes. That is, the user may be required neither to judge a shooting mode suitable for the subject based on the conditions of the subject to be photographed at his discretion nor to select the judged shooting mode from the menu displayed on the viewing screen.

The shooting modes previously prepared in the digital camera 1 are now described.

For example, "night scene mode", "night scene+portrait mode", "firework mode", "candle mode", "sport mode", "snow mode", "beach mode", "scene mode", "portrait mode", "macro shooting mode", and "loupe mode" are prepared in the digital camera 1.

The "night scene mode" is used to take photos of night scenes without spoiling the mood of the darkness. For example, the shutter speed is set to a lower value. Light emission from the strobe is inhibited. Under these conditions, photos are taken.

The "night scene+portrait mode" is used to take photos of a night scene and persons. For example, the shutter speed is set to a lower value. At the same time, the strobe is forced to emit light. Under these conditions, photos are taken.

The "firework mode" is used to photograph firework rockets. For example, the focal range is set to infinity. The aperture is set to relatively open state. The shutter speed is set to a lower value. Under these conditions, photos are taken.

The "candle mode" is used to photograph persons under light emanating from a candle or candles placed in the dark. For example, the shutter speed is set to a lower value. The ISO sensitivity is set to a higher value. Under these conditions, photos are taken.

The "sport mode" is used to photograph a subject moving at a high speed without any blurring. For example, the shutter speed is set to a higher value. Under this condition, photos are taken.

The "snow mode" is used to photograph snowy scenes. For example, the EV value (exposure value) is corrected in the + direction. Under this condition, photos are taken.

The "beach mode" is used to photograph seas and blue skies. For example, the aperture is set to a relatively small value. A correction is made to emphasize the blue of the whole scene. Under these conditions, photos are taken.

The "scene mode" is used to photograph mountains and sky. For example, the aperture is set to a relatively small value. A correction is made to emphasize the green of the whole scene. Under these conditions, photos are taken.

The "portrait mode" is used to photograph persons. For example, the aperture is set to a relatively large value. A correction is made to emphasize the flesh color of the whole scene. Under these conditions, photos are taken.

The "macro shooting mode" is used to photograph a subject that is located at such a small distance that the camera cannot focus the subject by the autofocus function. A setting is made such that photography is performed in a focal range different from the focal range of the autofocus function. The focal range of normal autofocus function is, for example, from 0.5 m to ∞. The focal range for the macro mode is from about 0.08 m to ∞ at the wide angle end and from about 0.25 m to ∞ at the far end, though the range may be different depending on the performance of the lenses constituting the lens portion 11. The focal range of the autofocus function is so set that the user can focus the image in a short time since the shutter button has been half depressed by the user (since the shooting operation has been started) if the subject is within the range. Where the mode is set to the macro mode, it takes some time to focus but a subject at a short distance can be photographed.

The "loupe mode" is used to photograph a subject that is at such a small distance that the macro mode cannot be used. The focal distance is fixed at the wide angle end. Shooting is performed at a focal range from about 0.01 m to 0.2 m.

A given number of shooting modes matched to the conditions are selected from these shooting modes and presented to the user.

Figure 2:
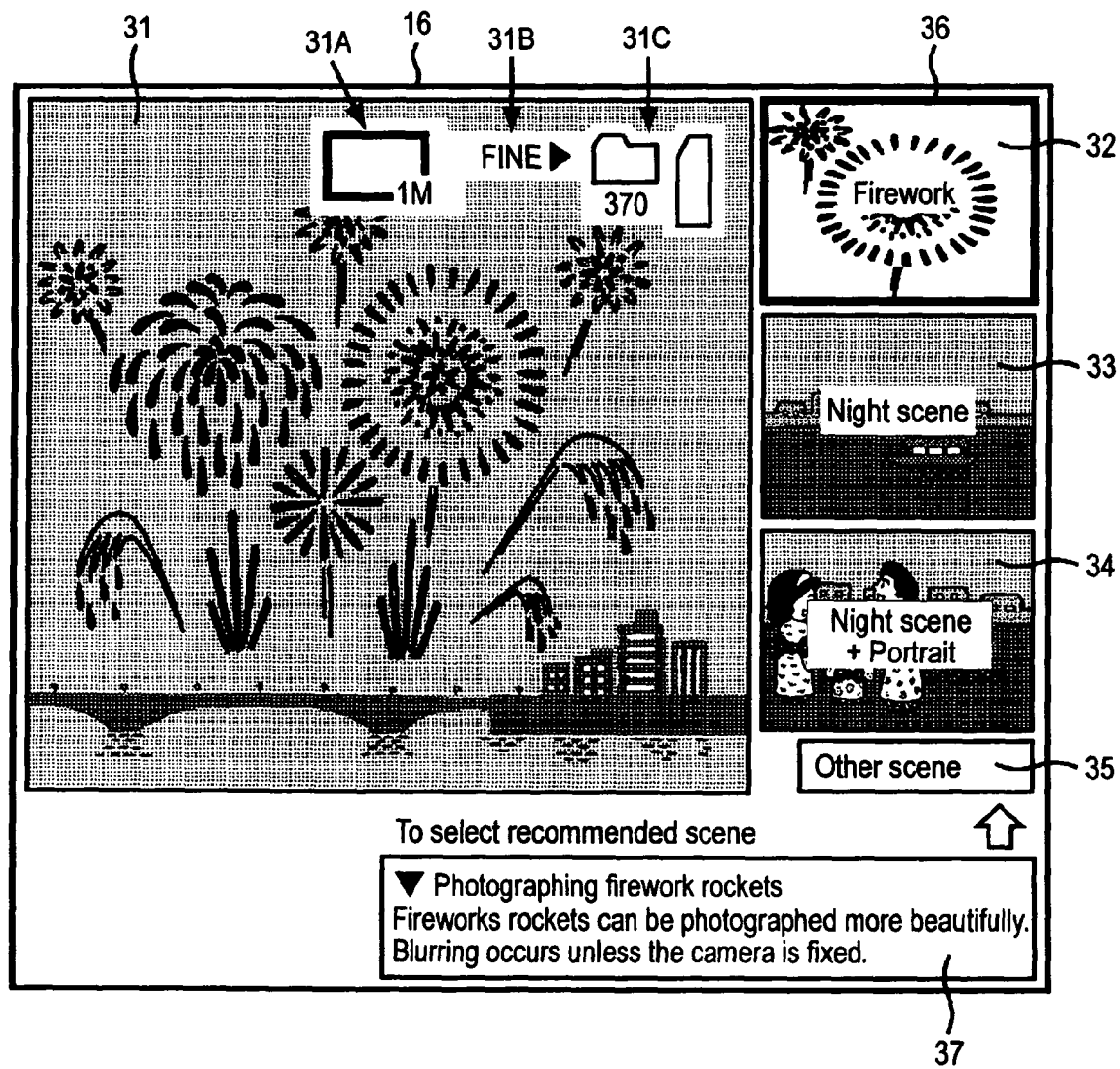
FIG. 2 shows an example of picture displayed on a viewing screen by a scene selection function.

FIG. 2 shows an example of image displayed on the display portion 16 by the scene selection function.

A relatively wide area of the display portion 16 is assigned to a captured image display region 31. A captured image is displayed on this captured image display region 31. The captured image indicates an image that can be photographed at the present settings including exposure. The user can see the information displayed on the captured image display region 31 and check the brightness of the image at the present settings. In the example of FIG. 2, an image of a subject is displayed on the captured image display region 31, the subject being a scene where a firework rocket has been launched into a night sky.

Icons 31A to 31C displayed at the right top side of the captured image display region 31 indicate the file size of the photographed image, image quality, and the number of images that can still be recorded, respectively.

In the example of FIG. 2, images 32 to 34 that are smaller than the captured image and a scene selection button 35 are vertically arranged and displayed adjacently to the captured image.

The images 32 to 34 are images indicating shooting modes selected according to the present conditions. The user manipulates the crisscross button to move a cursor 36 and depresses the decision button. Subsequent shooting can be done in the shooting mode selected by the cursor 36 when the decision button is depressed. In the example of FIG. 2, the cursor 36 is indicated by the bold line, and the image 32 has been selected.

The image 32 indicates the "firework mode". The word "firework" is superimposingly displayed. The user can set the shooting mode to the "firework mode", by putting the cursor 36 onto the image 32 and depressing the decision button. That is, the focal range is set to infinity. The aperture is set to a relatively large value. The shutter speed is set to a lower value. Under these conditions, photos can be taken.

The image 33 indicates the "night scene mode". The words "night scene" are superimposingly displayed. The user can set the shooting mode to the "night scene mode" by putting the cursor 36 on the image 33 and depressing the decision button. That is, the shutter speed is set to a lower value. Light emission from the strobe is inhibited. Under these conditions, photos can be taken.

The image 34 indicates "night scene+portrait mode". The expression "night scene+portrait" is superimposingly displayed. The user can set the shooting mode to the "night scene+portrait mode" by bringing the cursor 36 onto the image 34 and depressing the decision button. That is, the shutter speed is set to a lower value. The strobe is urged to emit light. Under these conditions, photos can be taken.

In this way, the "firework mode", "night scene mode", and "night scene+portrait mode" which are presented by the images 32-34, respectively, are shooting modes selected, for example, because the present time (time at which a photo is taken) is "night", the present date is in the summer season, and the distance at which the focus is made by the autofocus function is "infinity", respectively. That is, in this case, the criteria under which a shooting mode is selected are the present time, present date, and the distance at which the focus is made by the autofocus function, respectively.

What shooting modes are selected when the respective criteria are under what conditions will be described in detail later.

The scene selection button 35 is manipulated when a shooting mode other than the shooting modes presented by the images 32-34 is selected. The user can display a list of other shooting modes by bringing the cursor 36 onto the scene selection button 35 and depressing the decision button. The user can select his favorable shooting mode from the list.

A message display region 37 is formed below the images 32-34 and scene selection button 35. In the example of FIG. 2, a message "Photography of firework rockets. Firework rockets are photographed more beautifully . . . " is displayed as an explanation of the "firework mode" selected by the cursor 36. As the cursor 36 is moved, only the message of the shooting mode just selected by the cursor 36 is displayed. That is, as the cursor moves, the displayed message is successively switched.

Recommended shooting modes are selected from previously prepared shooting modes and automatically displayed in this way. Therefore, it is not necessary for the user to previously know what shooting modes are prepared. A shooting mode can be set simply by selecting one from the displayed modes. Consequently, a shooting mode can be set more efficiently than in the case where a shooting mode is selected from a menu displayed on the viewing screen.

Since the contents of shooting modes can be checked by seeing the messages by moving the cursor 36, it would not be necessary for the user to previously know what shooting modes should be selected under what conditions.

Figure 3:
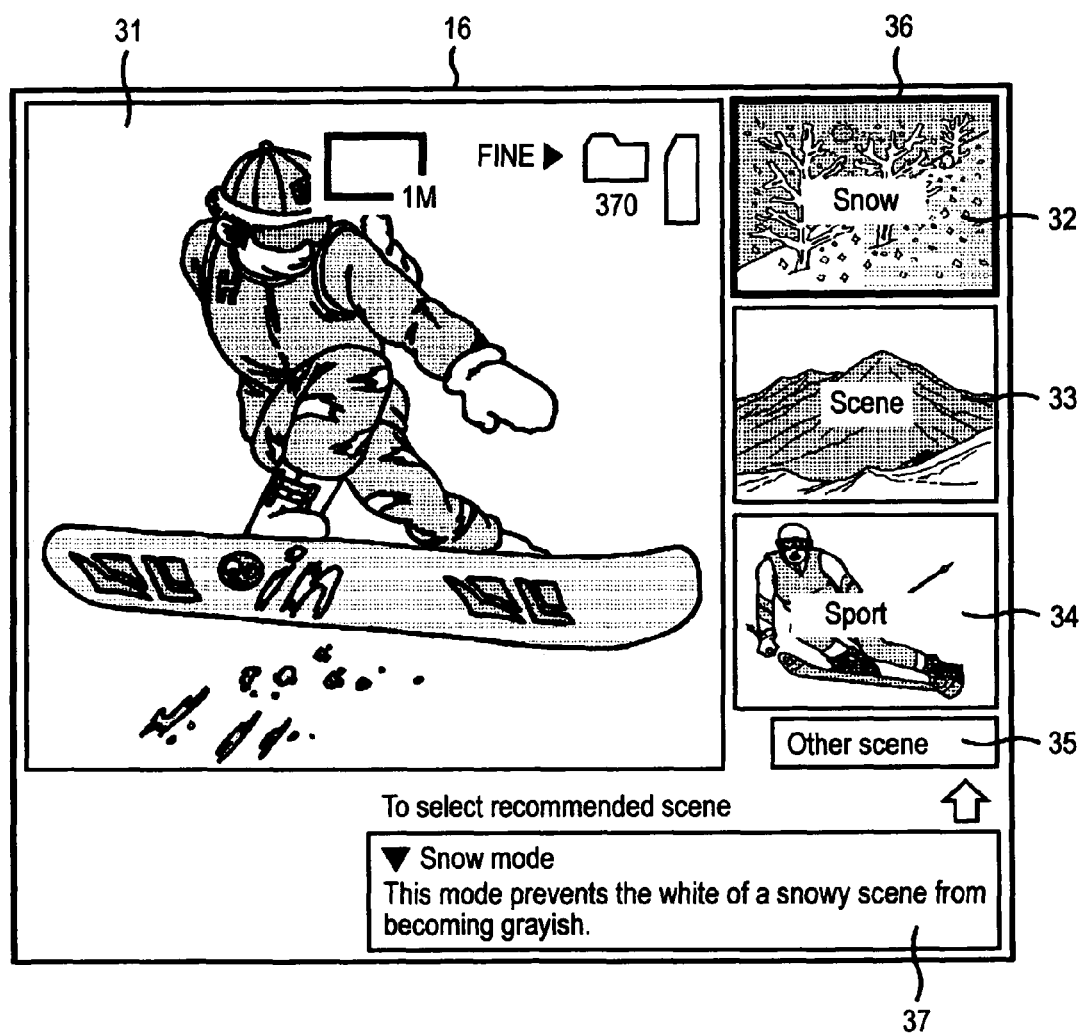
FIG. 3 shows another example of picture displayed on a viewing screen by the scene selection function.

FIG. 3 shows an example of another picture displayed on the display portion 16 by the scene selection function. Corresponding portions are indicated by the same numerals in both FIGS. 2 and 3.

In the example of FIG. 3, an image of a person, or subject, who is snowboarding on a ski slope is displayed on the captured image display region 31.

In the example of FIG. 3, images 32 to 34 and scene selection button 35 are shown to be arrayed adjacently to the captured image.

The image 32 of FIG. 3 indicates the "snow mode". The word "snow" is superimposingly displayed. The user can set the shooting mode to the "snow mode" (i.e., the exposure value is corrected in the +direction) by bringing the cursor 36 onto the image 32 and depressing the decision button. Under this condition, photos can be taken.

The image 33 indicates the "scene mode". The word "scene" is superimposingly displayed. The user can set the shooting mode to the "scene mode" (i.e., the aperture is set to a lower value, and a correction is made such that the whole scene is emphasized with green) by bringing the cursor 36 onto the image 33 and depressing the decision button. Under this condition, photos can be taken.

The image 34 indicates the "sport mode". The word "sport" is superimposingly displayed. The user can set the shooting mode to the "sport mode" (i.e., the shutter speed is set to a higher value) by bringing the cursor 36 onto the image 34 and depressing the decision button. Under this condition, photos can be taken.

The "snow mode", "scene mode", and "sport mode" presented by the images 32 to 34, respectively, are shooting modes selected, for example, based on the criteria (i) the present time is not "night", (ii) the present date is in the "winter" season, and (iii) a dark location is not photographed, in this way. That is, in this case, the criteria based on which a shooting mode is selected are three: the present time, the present date, and exposure of the location at which a photo is to be taken. It is determined whether the location at which a photo is to be taken is dark or not, for example, based on a histogramic distribution indicating the whole exposure of the captured image.

In the example of FIG. 3, a message "Snow mode This mode prevents the white of a snowy scene . . . " is displayed on the message display region 37 as an explanation of the "snow mode" selected by the cursor 36, the display region 37 being located under the images 32-34 and scene selection button 35.

The user can select a shooting mode matched with the subject to be photographed, by checking the message and the captured image displayed on the captured image display region 31.

The operation of the digital camera 1 which displays images and menus on the viewing screen as described so far will be described by referring to a flowchart.

Figure 4:
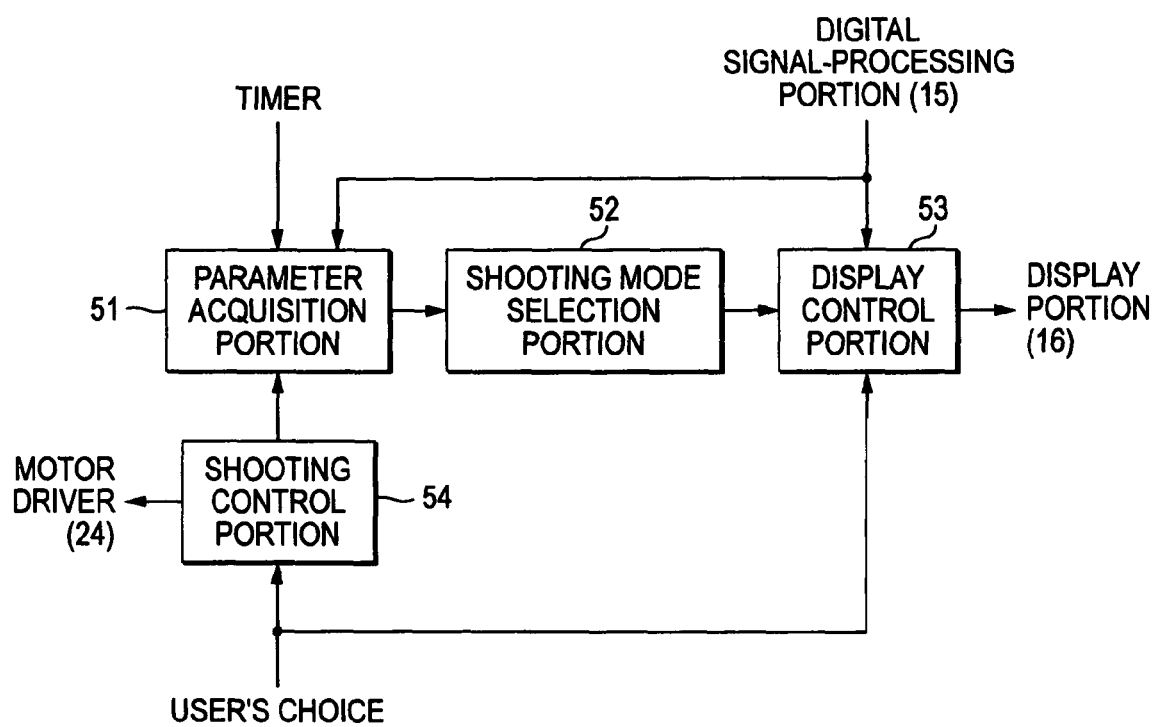
FIG. 4 is a block diagram showing an example of functional configuration of a digital camera.

FIG. 4 is a block diagram showing an example of functional configuration of the digital camera 1. At least a part of the functional portion shown in FIG. 4 is realized by execution of a given program by the CPU 18 of FIG. 1.

A parameter acquisition portion 51, a shooting mode selection portion 52, a display control portion 53, and the shooting control portion 54 are realized in the digital camera 1.

The parameter acquisition portion 51 acquires parameters providing basis for selecting a shooting mode. For example, the parameter acquisition portion 51 acquires information about the present date and time supplied from a timer as parameters. Furthermore, the parameter acquisition portion 51 obtains information supplied from the shooting control portion 54 as other parameters. That is, the information includes information about the distance at which the focus is made and information about the swiftness of motion of the subject, the swiftness being judged from movement of the focal point.

Furthermore, the parameter acquisition portion 51 judges the exposure of the captured image (status of the shooting location) and color hue of the subject (what color is prevalent) from the captured image supplied from the digital signal-processing portion 15. The parameter acquisition portion 51 acquires these kinds of information also as parameters. The parameters acquired by the parameter acquisition portion 51 are output to the shooting mode selection portion 52.

The shooting mode selection portion 52 selects a given number of shooting modes matched with the present conditions from shooting modes previously prepared in the digital camera 1 based on the parameters supplied from the parameter acquisition portion 51.

For example, three parameters (i.e., the present date, the present time, and the distance at which focus is made) are used with priority as criteria based on which a shooting mode is selected, out of the parameters supplied from the parameter acquisition portion 51. The other parameters are used as parameters with low priority in selecting shooting modes.

An example of a set of conditions under which a shooting mode is selected is described.

1. In a case where the present time is in the "nighttime",
four modes, i.e., "night scene mode", "nightscene+portrait mode", "candle mode", and "firework mode", are selected in this order (orders of priority). Where the present time is in the nighttime, the priority orders of the four shooting modes are interchanged by other parameters.

Where shooting modes are presented by images displayed on the viewing screen as shown in FIGS. 2 and 3, if four or more shooting modes are selected, images indicative of shooting modes with the upper three orders of priority, for example, are displayed adjacently to the captured image. The images indicative of the remaining shooting modes are displayed in a list that is displayed when the scene selection button 35 is selected.

(1) In a case where the present time is in the "nighttime" and the distance at which focus is made is "infinity",
four modes, i.e., "night scene mode", "firework mode", "night scene+portrait mode", and "candle mode" are selected in this order.

(2) In a case where the present time is in the "nighttime" and the distance at which focus is made is not "infinity",
four modes, i.e., "night scene+portrait mode", "candle mode", "night scene mode", and "firework mode", are selected in this order.

(3) In a case where the present time is in the "nighttime", the distance at which focus is made is "infinity", and the present date is in the "summer" season,
four modes, i.e., "firework mode", "night scene mode", "night scene+portrait mode", and "candle mode", are selected in this order. A shooting mode selected under these conditions is presented, for example, as shown in FIG. 2.

2. In a case where the present time is not in the "nighttime" and the shooting site is not in a "dark state",
five modes, i.e., the "portrait mode", "scene mode", "beach mode", "snow mode", and "sport mode", are selected in this order. If the present time is not in the "nighttime" and at the same time, the shooting site is not in a "dark state", the orders of priority of the five shooting modes are interchanged by other parameters or any one of the five shooting modes is removed from the presented shooting modes.

(1) In a case where the present time is not in the "nighttime", the shooting site is not in a "dark state", and the present date is in the "winter season",
four modes, i.e., "snow mode", "scene mode", "sport mode", and "portrait mode", are selected in this order. Shooting modes selected under these conditions are presented, for example, as shown in FIG. 3.

(2) In a case where the present time is not in the "nighttime", the shooting location is not in a "dark state", the present date is in the "winter" season, and "white" is prevalent in the hues of the subject,
four shooting modes, i.e., "snow mode", "scene mode", "portrait mode", and "sport mode", are selected in this order.

(3) In a case where the present time is not in the "nighttime", the shooting site is not in a "dark state", the present date is in the "winter" season, "white" is prevalent in the hues of the subject, and the distance at which focus is made is "infinity",
two modes, i.e., the "scene mode" and "snow mode", are selected in this order. In this case, only the images indicating two shooting modes are displayed adjacently to the captured image. Other shooting modes can be selected by manipulating the scene selection button 35.

(4) In a case where the present time is not in the "nighttime", the shooting site is not in a "dark state", the present date is in the "winter" season, "white" is prevalent in the hues of the subject, and the focus is "unstable" (the subject is in violent motion),
three shooting modes, i.e., "sport mode", "snow mode", and "portrait mode", are selected in this order.

(5) In a case where the present time is not in the "nighttime", the shooting location is not in a "dark state", and the present date is in the "summer" season,
four modes, i.e., "beach mode", "scene mode", "sport mode", and "portrait mode", are selected in this order.

(6) In a case where the present time is not in the "nighttime", the shooting site is not in a "dark state", the present date is in the "summer" season, and the distance at which focus is made is "infinity",
four modes, i.e., "scene mode", "beach mode", "portrait mode", and "sport mode", are selected in this order.

(7) In a case where the present time is not in the "nighttime", the shooting site is not in a "dark state", the present date is in the "summer" season, and the focus is "unstable",
four modes, i.e., "sport mode", "beach mode", "portrait mode", and "scene mode", are selected in this order.

3. In a case where the subject is "out of focus",
four modes, i.e., "macro mode", "loupe mode", "scene mode", and "portrait mode", are selected in this order.

4. In a case where none of the conditions 1-3 described above are satisfied,
three shooting modes, i.e., "portrait mode", "scene mode", and "sport mode", are selected in this order. In this case, the orders of priority of these three shooting modes are interchanged by other parameters.

(1) In a case where none of the conditions 1-3 described above are satisfied and the distance at which focus is made is "infinity",
three modes, i.e., "scene mode", "portrait mode", and "sport mode", are selected in this order.

(2) In a case where none of the conditions 1-3 described above are satisfied and the focus is "unstable",
three modes, i.e., "sport mode", "portrait mode", and "scene mode", are selected in this order.

(3) In a case where none of the conditions 1-3 described above are satisfied and none of the conditions (1) and (2) of 4 are satisfied, three modes, i.e., "portrait mode", "scene mode", and "sport mode", are selected in this order.

A shooting mode is selected by the shooting mode selection portion 52 under the conditions described above. The conditions under which a shooting mode is selected are not limited to the above-described conditions.

Referring back to FIG. 4, information for identifying the shooting mode selected by the shooting mode selection portion 52 is output to the display control portion 53.

The display control portion 53 displays the captured image on the captured image display region 31 based on the data supplied from the digital signal-processing portion 15, judges the shooting mode selected by the shooting mode selection portion 52 based on information supplied from the shooting mode selection portion 52, and displays an image indicative of the shooting mode selected by the shooting mode selection portion 52. Furthermore, the display control portion 53 displays an explanation of the shooting mode on the message display region 37, the shooting mode being selected by the cursor 36 out of the shooting modes for which images have been displayed. Thus, images are displayed on the viewing screen as shown in FIGS. 2 and 3.

The shooting control portion 54 controls the motor driver 24 to control the whole operation regarding photography. The shooting control portion 54 appropriately modifies the shutter speed, aperture, exposure, and other settings according to the shooting mode selected by the user and the shooting environments. Under these conditions, photos are taken.

Processing performed by the digital camera 1 when the scene selection function is activated is next described by referring to the flowchart of FIG. 5.

In step S1, the parameter acquisition portion 51 acquires parameters based on which a shooting mode is selected, and outputs the acquired parameters to the shooting mode selection portion 52.

In step S2, the shooting mode selection portion 52 selects a given number of shooting modes according to the conditions described above, using various parameters supplied from the parameter acquisition portion 51. The shooting mode selection portion 52 outputs information for identifying the selected shooting mode to the display control portion 53.

In step S3, the display control portion 53 juxtapositionally displays images indicating the shooting modes selected by the shooting mode selection portion 52 based on the information supplied from the shooting mode selection portion 52. Furthermore, the display control portion 53 displays the captured image on the captured image display region 31 based on the data supplied from the digital signal-processing portion 15.

In step S4, the shooting control portion 54 modifies the shutter speed, aperture, and other settings according to the shooting mode indicated by the image selected by the user out of the images displayed by the display control portion 53.

When the shutter button is depressed, the shooting control portion 54 takes photos in step S5 at the settings modified in step S4. Data about the image obtained by photography is acquired by the digital signal-processing portion 15, and compression and other processing are performed.

In step S6, the shooting control portion 54 controls the digital signal-processing portion 15, saves images obtained by the photography on the recording device 17, and ends the processing.

Because of the processing described so far, the user can take photos in a shooting mode matched with the conditions.

In the above-described processing, it is assumed that if the scene selection function is activated, pictures as shown in FIGS. 2 and 3 are displayed on the viewing screen. At normal times, the captured image is displayed over the whole display portion 16. Only if it is judged that there are shooting modes that can be recommended to the user, pictures as shown in FIGS. 2 and 3 may be displayed on the viewing screen.

In the description provided above, recommended shooting modes are presented by images on which words or characters are superimposed. Alternatively, shooting modes may be presented by displaying only words.

The sequence of processing steps described above may be executed in either hardware or software. Where the sequence of processing steps is executed in software, a program constituting the software is installed either into a computer incorporated in dedicated hardware or into a general-purpose personal computer or the like capable of executing various functions by installing various programs from a program-recording medium.

Figure 6:
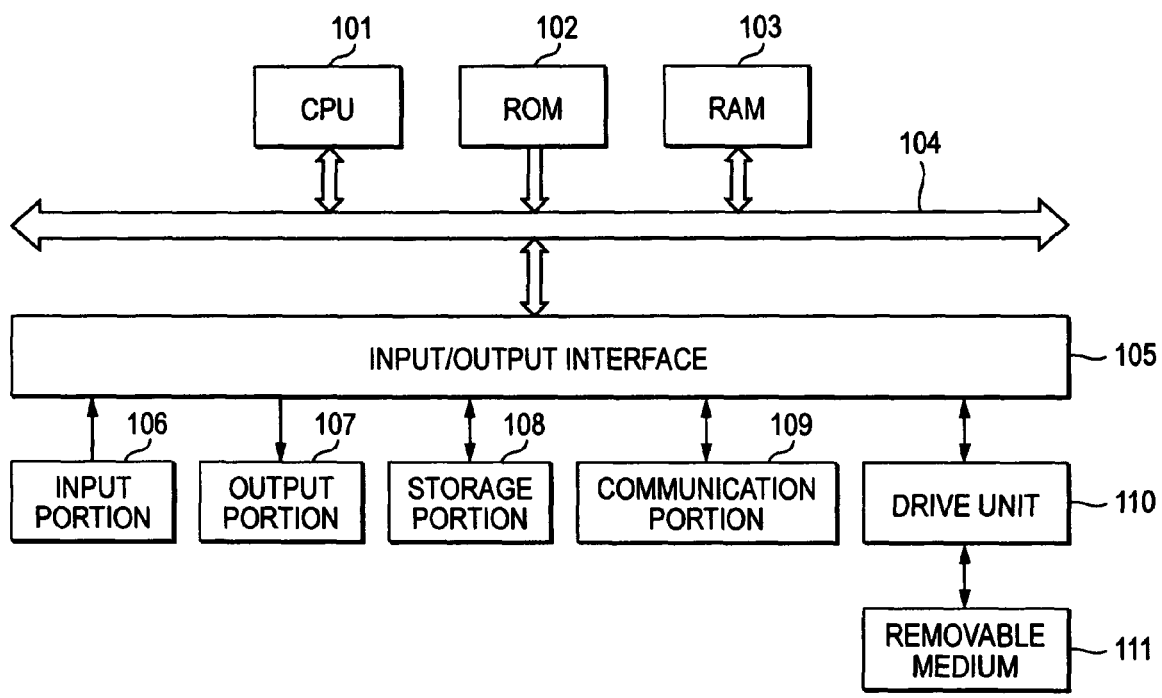
FIG. 6 is a block diagram showing an example of structure of a personal computer.

FIG. 6 is a block diagram showing an example of the structure of a personal computer that executes the aforementioned sequence of processing steps by a program. A CPU 101 performs various kinds of processing in accordance with a program stored in a ROM 102 or in a storage portion 108. The program executed by the CPU 101 and data are appropriately stored in a RAM 103. These CPU 101, ROM 102, and RAM 103 are interconnected by a bus 104.

A cell described in "Birth of Cell", *Nikkei Electronics*, Nikkei BP Corporation, Japan, Feb. 28, 2005, pp. 89-117, can be adopted as the CPU 101.

An input/output interface 105 is also connected with the CPU 101 via the bus 104. An input portion 106 made up of a keyboard, a computer mouse, a microphone, and other parts and an output portion 107 made up of a display device, speakers, and other parts are connected with the input/output interface 105. The CPU 101 performs various kinds of processing in response to instructions entered from the input portion 106. The CPU 101 outputs the results of processing to the output portion 107.

The storage portion 108 connected with the input/output interface 105 is made of a hard disc, for example, and stores programs executed by the CPU 101 and various kinds of data. A communication portion 109 communicates with an external device via a network such as the Internet or a local area network.

A program may also be acquired via the communication portion 109 and stored in the storage portion 108.

When a removable medium 111 such as a magnetic disc, optical disc, magneto-optic disc, or semiconductor memory is loaded in a drive unit 110 connected with the input/output interface 105, the drive unit 110 drives the medium and acquires programs and data recorded on the medium. The acquired programs and data are transferred to the storage portion 108 and stored there if necessary.

The program-recording medium storing a program that is installed in a computer and made executable by the computer is made of the removable medium 111 that is a packaged medium made of a magnetic disc (that can be a flexible disc), an optical disc (such as CD-ROM (compact disc-read only memory), DVD (digital versatile disc)), magneto-optic disc, or semiconductor memory. Alternatively, the program-recording medium is made of the ROM 102 in which a program is temporarily or permanently stored or of a hard disc forming the storage portion 108. The program is stored into the program-recording medium if necessary via the communication portion 109 that is an interface such as a router or modem and utilizing a wired or wireless communication medium such as a local area network (LAN), Internet, or digital satellite broadcast.

In the present specification, process steps stating a program stored on the program-recording medium can be carried out in the described order, of course, in chronological order. Besides, the process steps may be carried out in parallel or separately.

It should be understood by those skilled in the art that various modifications, combinations, sub-combinations and alterations may occur depending on design requirements and other factors insofar as they are within the scope of the appended claims or the equivalents thereof.

What is claimed is:

1. A photographic device comprising:
   acquisition means for acquiring a plurality of parameters;
   selection means for selecting a given number of shooting modes matched with shooting conditions in priority orders from a plurality of shooting modes previously prepared based on acquired parameters from the acquisition means in accordance with a priority arrangement therebetween such that one or more of the acquired parameters are given higher priority than other acquired parameters, in which a present date, a time of day, and a distance from the photographic device to an object being focused are all high priority parameters;
   display control means for juxtapositionally displaying images indicating the shooting modes selected by the selection means in priority orders; and
   shooting control means for taking photos in a shooting mode indicated by an image which has been selected by a user from the images displayed by the display control means,
   the given number is at least two and less than the number of previously prepared shooting modes.

2. A photographic device as set forth in claim 1, wherein said display control means displays an explanation of a shooting mode indicated in response to a user's manipulation, and which is included in the juxtapositionally displayed images indicating the shooting modes.

3. A photographic device as set forth in claim 1, wherein said display control means displays a captured image together with the images which indicate the shooting modes and which are smaller than the captured image.

4. A method of processing information, comprising the steps of:
   acquiring a plurality of parameters;
   selecting a given number of shooting modes matched with shooting conditions in priority orders from a plurality of shooting modes previously prepared based on acquired parameters in accordance with a priority arrangement therebetween such that one or more of the acquired parameters are given higher priority than other acquired parameters, in which a present date, a time of day, and a distance from the photographic device to an object being focused are all high priority parameters;
   juxtapositionally displaying images indicating the selected shooting modes in priority orders; and
   taking photos in a shooting mode indicated by an image selected from the displayed images by a user,
   the given number is at least two and less than the number of previously prepared shooting modes.

5. A non-transitory computer readable medium readable by a computer having a program stored thereon for causing the computer to perform processing including: acquiring a plurality of parameters; selecting a given number of shooting modes matched with shooting conditions in priority orders from a plurality of shooting modes previously prepared based on acquired parameters in accordance with a priority arrangement therebetween such that one or more of the acquired parameters are given higher priority than other acquired parameters, in which a present date, a time of day, and a distance from the photographic device to an object being focused are all high priority parameters; juxtapositionally displaying images indicating the selected shooting modes in priority orders; and taking photos in a shooting mode indicated by an image selected from the displayed images by a user, the given number is at least two and less than the number of previously prepared shooting modes.

6. A photographic device comprising:
   an acquisition device operable to acquire a plurality of parameters;
   a selection device operable to select a given number of shooting modes matched with shooting conditions in priority orders from a plurality of shooting modes previously prepared based on acquired parameters from the acquisition device in accordance with a priority arrangement therebetween such that one or more of the acquired parameters are given higher priority than other acquired parameters, in which a present date, a time of day, and a distance from the photographic device to an object being focused are all high priority parameters;
   a display control device operable to juxtapositionally display images indicating the shooting modes selected by the selection device in priority orders; and
   a shooting control device operable to take photos in a shooting mode indicated by an image which has been selected by a user from the images displayed by the display control device,
   the given number is at least two and less than the number of previously prepared shooting modes.

7. A photographic device as set forth in claim 1, further comprising a display portion having a viewing screen, in which the images indicating the shooting modes selected by the selection means and a captured image photographed by the user are displayed on the viewing screen of the display portion when a scene selection function is activated.

8. A photographic device as set forth in claim 7, in which the captured image photographed by the user is displayed over an entire portion of the viewing screen of the display portion during a normal operation when the scene selection function is not activated.

9. A photographic device as set forth in claim 1, in which the images indicating the shooting modes selected by the selection means include one or more words or characters.

10. A photographic device as set forth in claim 6, further comprising a display portion having a viewing screen, in which the images indicating the shooting modes selected by the selection device and a captured image photographed by the user are displayed on the viewing screen of the display portion when a scene selection function is activated.

11. A photographic device as set forth in claim 10, in which the captured image photographed by the user is displayed over an entire portion of the viewing screen of the display portion during a normal operation when the scene selection function is not activated.

12. A photographic device as set forth in claim 6, in which the images indicating the shooting modes selected by the selection device include one or more words or characters.

* * * * *